US007471671B2

(12) United States Patent
Xiong et al.

(10) Patent No.: US 7,471,671 B2
(45) Date of Patent: Dec. 30, 2008

(54) BAND SIGNAL DETECTION AND PRESENTATION FOR IP PHONE

(75) Inventors: Ying Xiong, San Jose, CA (US); Chang-Ho Lin, Milpitas, CA (US); Chih-Ping Lee, Cupertino, CA (US)

(73) Assignee: Innomedia Pte Ltd., Singapore (SG)

( * ) Notice: Subject to any disclaimer, the term of this patent is extended or adjusted under 35 U.S.C. 154(b) by 1082 days.

(21) Appl. No.: 10/788,817

(22) Filed: Feb. 27, 2004

(65) Prior Publication Data

US 2005/0190746 A1 Sep. 1, 2005

(51) Int. Cl.
*H04L 12/66* (2006.01)

(52) U.S. Cl. .................. 370/352; 370/215; 370/353; 370/419; 379/93.34; 379/207.16; 379/387.02; 379/406.15; 455/401

(58) Field of Classification Search .......... 370/202, 370/212–213, 215, 352–356, 401, 419; 379/93.28, 379/93.31, 93.34, 106.01, 207.16, 360, 373.02, 379/387.02, 406.15, 434; 455/401
See application file for complete search history.

(56) References Cited

U.S. PATENT DOCUMENTS

| 4,199,809 | A * | 4/1980 | Pasahow et al. ............ 370/210 |
|---|---|---|---|
| 4,211,895 | A * | 7/1980 | Davis et al. ................ 370/384 |
| 5,640,448 | A * | 6/1997 | Toyoshima ................. 379/165 |
| 5,805,677 | A * | 9/1998 | Ferry et al. .............. 379/93.35 |
| 5,953,391 | A * | 9/1999 | Kenmochi .................... 379/77 |
| 6,011,794 | A * | 1/2000 | Mordowitz et al. ......... 370/389 |
| 6,169,734 | B1 * | 1/2001 | Wilson ....................... 370/352 |
| 6,438,384 | B1 * | 8/2002 | Chen .......................... 455/462 |
| 6,625,269 | B1 * | 9/2003 | Kim ............................ 379/156 |
| 6,636,506 | B1 * | 10/2003 | Fan ............................ 370/356 |
| 6,665,375 | B1 * | 12/2003 | Forlenza et al. .............. 379/52 |
| 6,724,750 | B1 * | 4/2004 | Sun ............................ 370/352 |
| 6,940,819 | B2 * | 9/2005 | Kato ........................... 370/237 |
| 7,058,171 | B2 * | 6/2006 | Ouchi et al. ............. 379/355.02 |
| 7,170,981 | B2 * | 1/2007 | Lim ......................... 379/93.09 |
| 7,190,771 | B2 * | 3/2007 | Veschi ..................... 379/93.01 |
| 7,224,739 | B2 * | 5/2007 | Griffin et al. ................ 375/259 |
| 7,349,514 | B2 * | 3/2008 | Meltzer et al. .............. 375/376 |
| 2001/0012285 | A1 * | 8/2001 | Shaharabani et al. ........ 370/352 |

(Continued)

*Primary Examiner*—Fan Tsang
*Assistant Examiner*—Hemant Patel
(74) *Attorney, Agent, or Firm*—Timothy P. O'Hagan

(57) ABSTRACT

A VoIP telephone operates in an IP environment wherein at least a portion of the signaling from a remote gateway is included within a media session real time protocol stream. The VoIP telephone comprises a network communication system for encapsulating data into IP frames for exchange with remote devices over a frame switched network. A system client application is coupled to the network communication system and exchanges call set up messages with a remote VoIP gateway to establish a media channel for the exchange of the real time protocol streams. The system client also provides VoIP status signals to a presentation module. A dialog system is coupled to the network communication system and: i) translates frames of compressed digital audio data originated from a remote device to recreate remote voice band; ii) detects and compresses local voice band for transmission to the VoIP gateway; iii) detects in band signaling within the voice band; and iv) generates in band status signals to the presentation module. The presentation module receives session status signals from each of the system client and from the dialog system and drives a display of session status messages on a display screen.

7 Claims, 3 Drawing Sheets

U.S. PATENT DOCUMENTS

2002/0054588 A1*  5/2002  Mehta et al. ................ 370/352
2004/0057421 A1*  3/2004  Kawabata et al. ........... 370/352
2005/0105540 A1*  5/2005  Baumann et al. ............ 370/401

* cited by examiner

| Frequency Pattern | Cadence Pattern | FSK Pattern | Session Status Signal 52 |
|---|---|---|---|
| Busy Frequency | 0.5 on / 0.5 off | — | "Busy" Signal 104 |
| Ring Frequency | 2.0 on / 4.0 off | — | "Ringing" Signal 106 |
| DTMF Digit | — | — | "Digit" Signal 108 |
| — | — | Call ID Start (between rings) | "Call ID" Signal 110 |
| — | — | Call ID Digit | "Call ID Digit" Signal 112 |
|  |  |  |  |
|  |  |  |  |

| Look Up Table | |
|---|---|
| Session Status Signal 52 | Session Status Message 50 |
|  |  |
|  |  |
|  |  |
|  |  |

BAND SIGNAL DETECTION AND PRESENTATION FOR IP PHONE

TECHNICAL FIELD

The present invention relates to an internet telephony device, and more particularly to an internet telephony device that displays session status messages that correspond to both IP session signaling and in-band session signaling.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each of the two endpoint telephones is coupled to a local switching station by a dedicated pair of copper wires known as a subscriber loop. The two switching stations are connected by a trunk line network comprising multiple copper wire pairs. When a telephone call is placed, the circuit is completed by dynamically coupling each subscriber loop to a dedicated pair of copper wires in the trunk line network that completes the circuit between the two local switching stations.

Because each call placed by, or to, a subscriber loop must route through the local switching station, billing for calling services may be readily handled by equipment placed at the local switching station.

While the dedicated circuit architecture of the circuit switched network was originally established for carrying an analog voice audio signal of a fixed bandwidth for the entire duration of the call, advances in technology enable digital data to be modulated on the twisted pair subscriber loop at very high data rates. For example, utilizing DSL technology, a telephony service provider can simultaneously provide both traditional telephony service (for one or more lines) as well as Internet access over a single subscriber loop by digitizing analog audio signals and utilizing a time division access scheme.

In one embodiment, often referred to as CBR, a time slot for supporting each telephony line remains permanently reserved on the subscriber loop regardless of whether such line is active (e.g. off-hook) or inactive (e.g on-hook) and a separate time slot for supporting packet switched data supports the provision of Internet access.

At the telephony service provider's switching station, both an Internet router and a telephone switch are coupled to the subscriber loop. During the time slots reserved for telephone service, the telephony switch communicates with a converter at the customer's premises. During the time slot reserved for Internet access, the Internet switch communicates with a DSL modem at the customer's premises.

More recently, telephone service has been implemented utilizing protocols known as voice over Internet Protocol (VoIP). Advances in the speed of data transmissions and Internet bandwidth have made it possible for telephone conversations to be communicated using the Internet's packet switched architecture with the overhead of the TCP/IP and UDP/IP protocols.

There exist several advantages of using VoIP to support one or more telephone lines over a DSL subscriber loop. First, the bandwidth of the subscriber loop is more efficiently allocated—dedicated time slots are not reserved for inactive telephone lines. Secondly, a combination of a VoIP-SS7 signaling gateway and a VoIP trunking gateway, located at any Internet addressable location, can replace a telephony switch at the telephony service provider's central office. Thirdly, calls placed to another VoIP line can be routed by a device commonly known as a "call agent" or "soft switch" as a peer-to-peer VoIP calls directly to the other endpoint across the Internet without use of a PSTN circuit.

However, a challenge with peer-to-peer VoIP telephony is that the telephony service provider's central office is completely bypassed making measuring of the call duration and billing for the call quite complicated. To facilitate the use of VoIP telephony with legacy billing systems, a device commonly known as a GR303 gateway has been developed.

A GR303 gateway, which is controlled by the telephony service provider, operates as a VoIP endpoint for all calls to and from a VoIP endpoint at the subscriber's premises. When a call is placed by the VoIP device at the subscriber's premises to a destination endpoint (either PSTN or VoIP), a call agent or soft switch directs the signaling to the GR303 gateway which immediately establishes a UDP/IP channel with the VoIP device and attempts to establish either a circuit switched connection over the PSTN or a VoIP connection over the Internet with the destination endpoint. After establishing the UDP/IP channel with the VoIP device, all further session signaling (such as busy tone and ring back tone) is provided in-band (e.g. as part of an audio signal that is digitized and compressed for transmission through the UDP/IP channel).

When a call is placed to the VoIP device at the subscriber's premises, the GR303 gateway receives the call and attempts to establish a UDP/IP channel with the VoIP device. After establishing the UDP/IP channel, all further session signaling (such as caller ID signals) are provide in band.

A problem associated with providing session signaling in the audio that is digitized and compressed for transmission over UDP/IP channels is that such signaling is only useful after the digitized and compressed audio is converted back to an analog or digital PSTN signal and is only interpretable by a traditional analog or digital PSTN device. When a multimedia terminal adapter (MTA) or other converter is used at the customer premises to emulate a PSTN analog or digital signal and the customer couples traditional PSTN equipment thereto, the PSTN equipment can readily interpret the session signaling.

However, if a VoIP telephone is used at the customer's premises, a traditional PSTN analog or digital signal is never generated and the in-band signaling remains unrecoverable. What is needed is a VoIP telephone with the capabilities of recognizing and interpreting signaling provided within digitized and compressed audio data over a UDP/IP channel with a remote gateway.

SUMMARY OF THE INVENTION

A first aspect of the present invention is to a VoIP telephone which operates in an IP environment wherein at least a portion of the signaling from a remote gateway is included within the voice band which is transmitted as a real time protocol stream during a media session.

The VoIP telephone comprises a network communication system for encapsulating data into IP frames for exchange with remote devices over a frame switched network.

A system client application is coupled to the network communication system and exchanges call set up messages with a remote VoIP gateway to establish a media channel for the exchange of the real time protocol streams. The system client also provides VoIP session status signals to a presentation module.

A dialog system is coupled to the network communication system and: i) translates frames of compressed digital audio data originated from a remote device to re-create remote voice band; ii) detects in-band signaling within the remote voice band; and iii) provides in band session status signals, corresponding to detected in-band signaling, to the presentation module. The presentation module receives the session status signals from each of the system client and from the dialog system and drives a display of session status messages on a display screen.

In the exemplary embodiment, the dialog system comprises an audio DSP, a speaker, and a microphone. The audio DSP provides for: i) receiving the compressed audio data originated from the remote device; ii) recreating the remote voice band and driving the speaker to generate audio corresponding to the remote voice band; iii) detecting in-band signaling within the remote voice band; and iv) providing session status signals to the presentation module.

The audio DSP further receives local voice band corresponding to audio detected by the microphone; ii) compresses the local voice band into compressed audio data for transmission to the gateway; iii) detecting in-band signaling within the local voice band; and iv) providing session status signals, corresponding to detected in-band signaling within the local voice band, to the presentation module.

The audio DSP may comprises a signal detection module which detects in-band signaling within the voice band. The in-band signaling may be at least one of frequency signaling, cadence signaling, and phase shift signaling. The in-band signal detection module detects the frequency signaling, cadence signaling, and phase shift signaling within the remote voice band and generates a session status signal corresponding to the detected in-band signaling.

In the exemplary embodiment, the presentation module comprises a message look up table storing a plurality if session status messages, each in association with a session status signal. The presentation module generates a session status message on the display in response to receiving a session status signal by looking up the session status message that corresponds to the session status signal in the message look up table.

The system client application may also provide, to the presentation module, session status signals related to the media channel. In such embodiment, the presentation module receives both the session status signals generated by the system client application (VoIP session status signals) and the session status signals generated by the in-band signal detection module (in-band session status signals) and generate a plurality of session status messages for display on the display 30, each of the plurality of session status messages corresponding to a received session status signal.

For a better understanding of the present invention, together with other and further aspects thereof, reference is made to the following description, taken in conjunction with the accompanying drawings. The scope of the present invention is set forth in the appended clams.

DETAILED DESCRIPTION OF THE EXEMPLARY EMBODIMENTS

Figure 1:
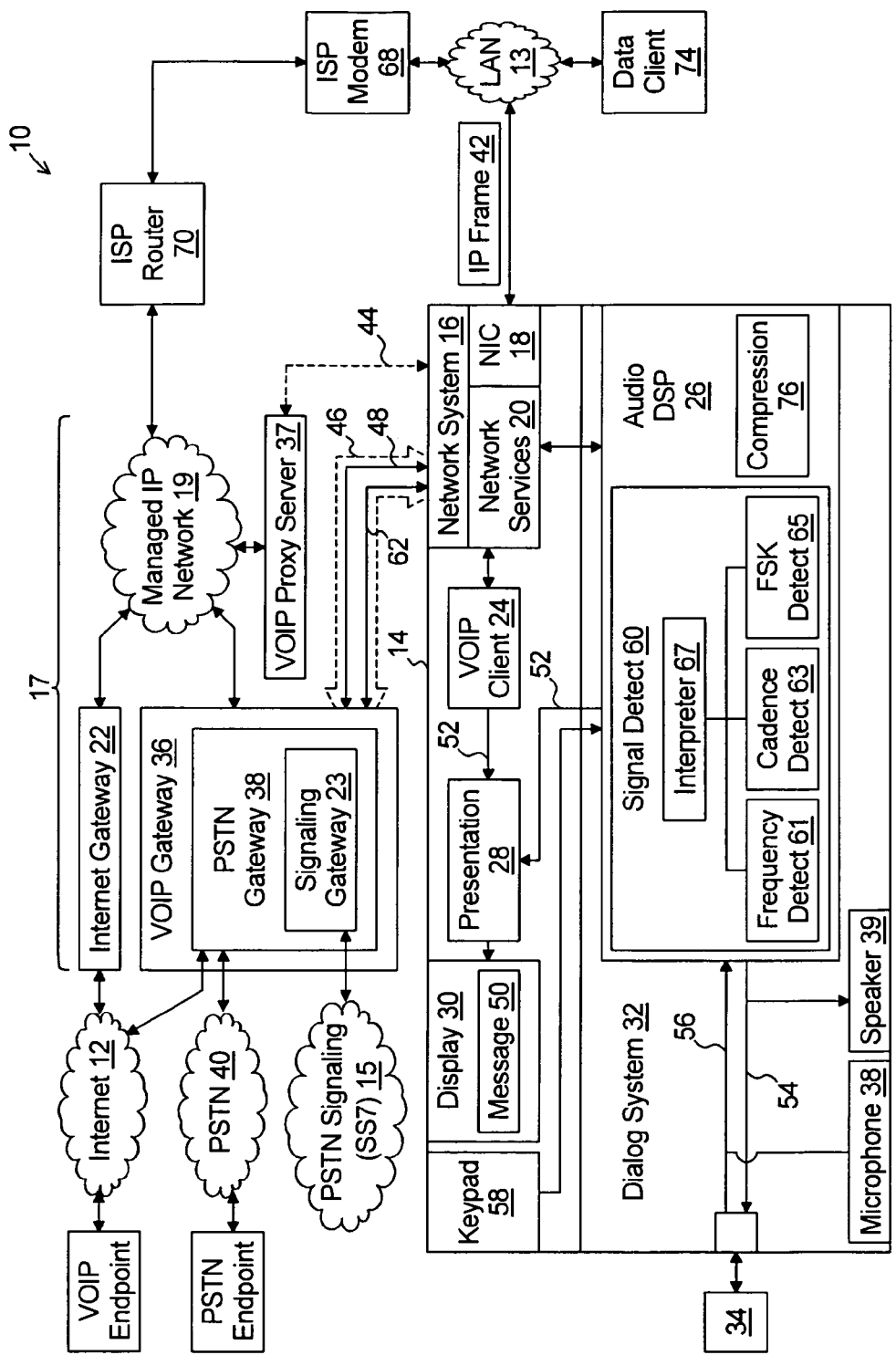
FIG. 1 is a block diagram representing a system for providing VoIP communication services and Internet data connectivity over a frame switched network in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

FIG. 1 represents a system 10 for providing both telephone line service and Internet data service to a subscriber's premises 72. The system 10 comprises back end systems 17 of the service provider and each of a VoIP telephone 14 and a network access module 68 at the subscriber's premises. The back end systems 17 may comprise an ISP router 70, a VoIP proxy server 37, an internet gateway 22, and a VoIP gateway 36 coupled together by a managed network 19—which may be an IP compliant network.

In the exemplary embodiment, the service provider is a traditional PSTN telephone service provider utilizing Digital Subscriber Line (DSL) technology to provide Internet access and telephone service utilizing VoIP. As such, the network access module 68 at the customer's premises may be a known DSL modem and the ISP router 70 may be a known DSL router which communicates with each DSL modem and each subscriber premises and uses known routing technology to route IP frames between each DSL modem and the Internet gateway 22, the proxy server 37, and the VoIP gateway 36 over the managed IP network 19.

The VoIP gateway 36 may be a gateway commonly known as a GR303 gateway which operates as a VoIP endpoint (establishing a VoIP media session leg between itself and the VoIP telephone 14) for all calls placed by the VoIP telephone 14 and for all calls dialed to the "Virtual subscriber loop" associated with the VoIP telephone 14. A more detailed discussion of an exemplary gateway is described herein.

The VoIP telephone 14 at the subscriber's premises may be coupled to the network access module 68 by a local area network 13. The VoIP telephone 14 enables an operator to initiate and receive telephone calls utilizing the "virtual subscriber loop service" provided by the VoIP gateway 36. More specifically, due to the nature of the gateway 36 providing the "virtual subscriber loop" over a single media session 46 with the VoIP telephone 14, the VoIP telephone 14 comprises means for establishing the media session 46, means for exchanging voice band with the VoIP gateway 36 over the media session 46, and means for detecting in-band call signaling 62 (e.g. tone and frequency shift signals within the voice band) and driving a display of session status messages in accordance therewith. More specifically, the VoIP telephone 14 comprises a network system 16, a VoIP client 24, a dialog system 32, a display 30, a presentation module 28, and a keypad 58.

The network system 16 utilizes known physical layer protocols which are compliant with those utilized by the local area network 24 which interconnects the VoIP telephone 14 to the network access module 68. In the exemplary embodiment, the network system 16 may communicate with the network access module 68 using a known communication standard such as USB or Ethernet.

The network system 16 receives session set up frames from the VoIP client 24 and media session frames from the dialog system 32, packages the frames as UDP/IP frames 42 with applicable source and destination socket information, and forwards the UDP/IP frames 42 to the applicable remote device over the local area network 24. The network system 16 also receives UDP/IP frames over the local area network 24 and presents the data therein to either the VoIP client or the dialog system 32 based on a destination socket (IP address and port number) of the received frame.

The keypad 58 is a typical telephone keypad which enables the operator to dial a destination to which a telephone call is to be initiated and navigate telephone menus of voice mail systems and other systems driven by telephone menus. In the exemplary embodiment, the output of the keypad is provide to the dialog system 32 such that, for each key depressed, an applicable DTMF tone may be modulated onto a local voice band 56 for transfer in-band over the media session 46.

In the exemplary embodiment, the VoIP client 24 exchanges known Media Gateway Control Protocol (MGCP, RFC3435, RFC3661) messages 44 with the call agent 37 and (when directed by the call agent) with the gateway 36 for executing VoIP media session signaling and establishing the UDP/IP media session 46 with the gateway 36. The VoIP client 24 also provides session status signals 52 corresponding to VoIP session signaling (such as ringing, busy, and MGCP caller ID messages) to the to the presentation module 28 such that the presentation module 28 can display an appropriate session status message 50 on the display 30. A more detailed operation of the VoIP client is included herein.

The dialog system 32 comprises an audio DSP 26, a speaker 36 and a microphone 38. The audio DSP 26 comprises a signal detection module 60 a compression module 76, and a framing module. The speaker 39 and the microphone 38 may be a traditional telephone technology speaker and microphone embodied in the VoIP telephone housing or embodied in a remote corded or wireless handset 34.

The compression module 76 operates algorithms which: i) compresses a local voice band 56 representing audio detected by the microphone 38 into a RTP stream of compressed digital audio frames (i.e. media session data 48) for transmission to a remote device (e.g. the VoIP gateway 36) over the media session 46; and ii) receiving and decompressing an RTP stream of compressed digital audio data to re-generate the remote voice band 54. Exemplary compression/decompression algorithms utilized by the compression module 76 include: i) algorithms that provide minimal (or no) compression (useful for fax transmission) such as algorithms commonly referred to as G.711, G.726; ii) very high compression algorithms such as algorithms commonly referred to as G.723.1 and G.729D; and iii) algorithms that provide compression and high audio quality such as algorithms commonly referred to as G.728, and G. 729E.

The signal detection module 60: i) receives the remote voice band 54 and the local voice band 56 (in digital form); ii) utilizes pattern matching techniques to detect both traditional tone and phase shift call signaling within the voice bands 54 and 56 (e.g. in-band signaling) such as dial tone, DTMF tones, ring back signal, busy signals, call waiting signal, caller ID signals, and flash signals; and iii) provides session status signals 52 (corresponding to the detected in-band signal) to the to the presentation module 28 such that the presentation module 28 can display an appropriate session status message 50 on the display 30.

The presentation module 28 receives the session status signals 52 from each of the VoIP client 24 and an audio DSP 26 of the dialog system and drives the display of the session status messages 50 on the display 30. The display 30 may be a liquid crystal display (of the type normally used on telephones) which displays information in accordance with display signals provided by the presentation module 28.

Detailed VoIP Client

As discussed, the VoIP client 24 exchanges MGCP messages 44 with the call agent 37 and with the VoIP gateway 36 for executing VoIP media session signaling and establishing the media session 46 with the gateway 36 and provides session status signals 52 corresponding to VoIP session signaling to the to the presentation module 28.

Figure 2B:
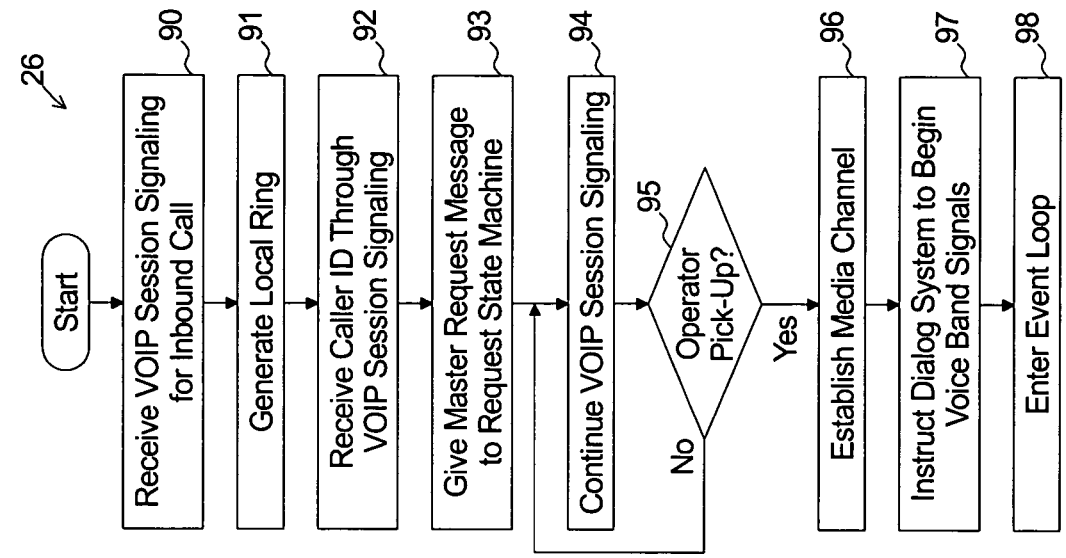
FIG. 2b is a flow chart representing exemplary operation of a VoIP client module in accordance with one embodiment of the present invention.
Figure 2A:
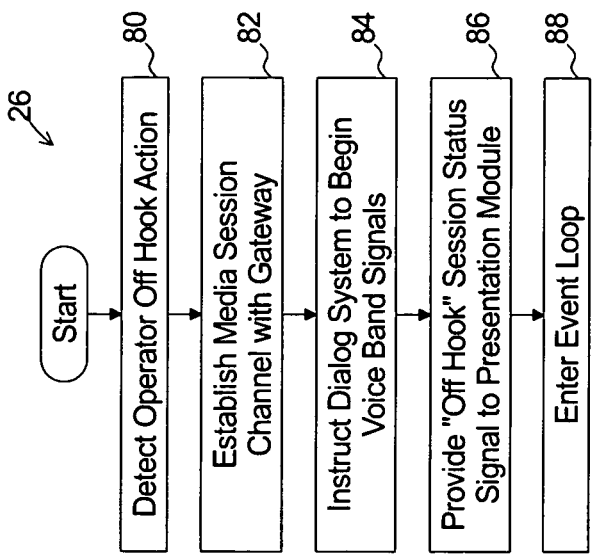
FIG. 2a is a flow chart representing exemplary operation of a VoIP client module in accordance with one embodiment of the present invention.

The flow chart of FIG. 2a represents exemplary steps that may be performed by the VoIP client 24 in establishing an outbound call over the virtual subscriber loop provided by the gateway 36.

Step 80 represents detecting that the operator has picked up the handset of the IP telephone 14 or otherwise taken the IP telephone 14 "off-hook". Upon detecting that the operator has taken the IP telephone 14 "off hook", the VoIP client 24 utilizes traditional MGCP session signaling messages (or other known VoIP session signaling messages) to establish the media session 46 with the gateway 36 at step 82.

Step 84 represents instructing the dialog system 32 to begin transferring voice band through the UDP/IP media session.

Upon beginning the transfer of voice band, the dialog system 32 will be receiving Real Time Transport Protocol (RTP) frames representing the remote voice band 54 generated by the VoIP gateway 36 or the destination endpoint of the telephone call. Because the VoIP telephone 14 was just taken off hook the remote voice band 54 will contain dial tone generated by the VoIP gateway 36. The dialog system 32 will also be generating the local voice band 56 and compressing the local voice band 56 into RTP frames for transfer to the gateway 36. Upon the operator dialing the telephone number associated with the remote endpoint, the dialog system 32 will modulate DTMF tones, representing dialing of the destination telephone number, onto the local voice band 56 for transmission to the VoIP gateway 36.

Step 86 represents generating an "off hook" session status signal 52 to the presentation module 28 such that the presentation module 28 can display an appropriate session status message 50 on the display 30.

Step 88 represents the VoIP client 24 entering an event loop whereby it waits for events which require further operations as is known in the art of MGCP client technology.

The flow chart of FIG. 2b represents exemplary steps that may be performed by the VoIP client 24 in establishing an outbound call.

Step 90 represents receiving a VoIP session signaling message from a remote endpoint which, in the exemplary embodiment, will be the gateway 36. Step 91 represent generating a local ring signal to alert the operator of an inbound call dialed to the "virtual subscriber loop".

Step 92 represents receiving caller ID data via VoIP session signaling messages and step 93 represents providing a session status message 52 to the presentation module 28 which includes the caller ID data such that the presentation module 28 can display an appropriate session status message 50 on the display 30.

Step 94 represents exchanging other applicable VoIP session signaling messages with the VoIP gateway 36 as are typically performed when establishing a VoIP media session utilizing MGCP session signaling messages.

If the operator answers the ringing VoIP telephone 14 as determined at box 95, the VoIP client 24 establishes the UDP/IP media session 46 with the VoIP gateway 36 at step 96 and instructs the dialog system 32 to begin transferring voice band through the UDP/IP media session 46. If the operator does not pick up, standard VoIP session signaling will continue to take place at step 94 until the calling endpoint hangs up or the session signaling is otherwise terminated.

After the media session 46 is established, both operators will be "on the line" and the voice band received from the VoIP gateway 36 will include the remote operators voice and the local voice band generated by the dialog system 32 will include the voice of the operator of the telephone 14 as detected by the microphone 38.

Detailed Signal Detection Module

As discussed, the signal detection module 60: i) receives the remote voice band 54 and the local voice band 56 (in digital form); ii) utilizes pattern matching techniques to detect both traditional tone and phase shift call signaling within the voice bands 54 and 56; and iii) provides session status signals 52 to the to the presentation module 28.

To perform such functions, the signal detection module 60 comprises frequency detection circuits 61, cadence detection circuits 63, phase shift detection circuits 65, and an interpreter circuit 67.

The frequency detection circuits 61 utilizes pattern matching techniques to match frequencies modulated on voice band with known frequencies representing dial tone, DTMF tones, ring back tone, and busy tone. In response to detecting a known frequency, the frequency detection circuit 61 reports the known frequency detected to the interpreter circuits 67.

The cadence detection circuit 63 utilizes pattern matching techniques to match cadence on voice band with known cadence patterns representing the 0.5 second "on"/0.5 second "off" cadence of a busy tone and the 2.0 second "on"/4.0 second off cadence of a ring back tone. In response to detecting a known cadence pattern, the cadence detection circuit 63 reports the known cadence pattern detected to the interpreter circuits 67.

The phase shift detection circuit 65 utilizes pattern matching techniques to match phase shifts of the voice band with known phase shift patterns representing caller ID data. In response to detecting phase shift patterns, the phase shift detection circuit 65 reports the phase shift patterns to the interpreter circuits 67.

The interpreter circuit 67: i) receives indication of the frequency, cadence, and phase shift patterns provided by the frequency detection circuit 61, the cadence detection circuit 63, and the phase detection circuit 65; and interprets such data to provide applicable session status signals 52 to the presentation module 28.

Figures 3, 4, 5:
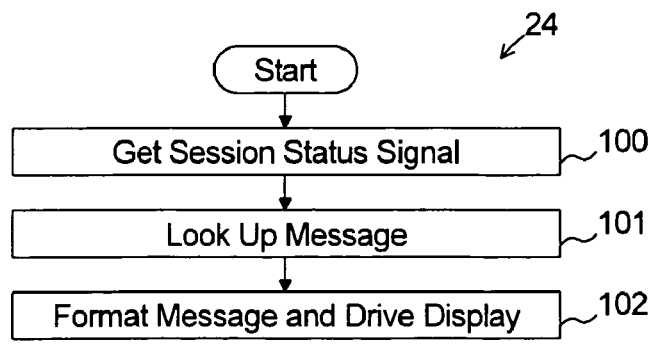
FIG. 3 is a table representing exemplary operation of an in-band signal detection module in accordance with one embodiment of the present invention.
FIG. 4 is a table representing exemplary operation of a presentation module in accordance with one embodiment of the present invention.
FIG. 5 is a flow chart representing exemplary operation of a presentation module in accordance with one embodiment of the present invention.

The table of FIG. 3 represents exemplary operation of the interpreter circuit 67. The interpreter circuit 67 matches a combination of: i) frequency patterns (as detected by the frequency detection circuits 61), cadence patterns (as detected by the cadence detection circuits 63), and phase shift patterns (as detected by the phase shift detection circuit 65) and generates a session status signal 52 that corresponds to the pattern matched.

For example, upon the interpreter circuit 67 receiving: i) an indication that the frequency detection module 61 has matched the frequency corresponding to a busy signal and ii) an indication that the cadence detection module 63 has matched the 0.5 second "on"/0.5 second "off" cadence of a busy tone, the interpreter circuit 67 provides a predefined busy signal status message 104 to the presentation module 28.

Similarly, upon the interpreter circuit 67 receiving: i) an indication that the frequency detection module 61 has matched the frequency corresponding to a ring back signal and ii) an indication that the cadence detection module 63 has matched the 2.0 second "on"/4.0 second "off" cadence of a ring back signal, the interpreter circuit 67 provides a predefined ringing status message 106 to the presentation module 28.

Upon the interpreter circuit 67 receiving: i) an indication that the frequency detection module 61 has matched the frequency corresponding to the DTMF tone of a particular digit, and ii) an indication that the cadence detection module 63 has matched a time duration typical of operator activation of a key pad button, the interpreter circuit 67 provides an indication of the digit 108 (as a session status signal 52) to the presentation module 28.

Upon the interpreter circuit 67 receiving: i) an indication that the phase shift detection circuit 65 has detected a pattern corresponding to the start of caller ID data; and ii) such detection by the phase shift detection circuit 65 is between rings of a ring back tone, the interpreter circuit 67 provides a predefined caller ID message 110 to the presentation module 28.

Upon the interpreter circuit 67 receiving: i) an indication that the phase shift detection circuit 65 has detected a pattern corresponding to a caller ID digit; and ii) such detection by the phase shift detection circuit 65 is after the start of caller ID data, the interpreter circuit 67 provides an indication of the digit 112 (as a session status signal 52) to the presentation module 28.

The above described examples of operation of the interpreter circuit 67 are exemplary only. It is envisioned that an implementation of the present invention may include detection of other in-band signaling and reporting of corresponding session status signals 52 to the presentation module.

Detailed Presentation Module

As discussed, the presentation module 28 receives the session status signals 52 from each of the VoIP client 24 and the audio DSP 26 and drives the display of the session status messages 50 on the display 30.

The presentation module 28 may comprise a message look up table 64 as represented by the table of FIG. 4. The flow chart of FIG. 5 represents exemplary operation of the presentation module 28. Step 104 represents receiving one or more session status messages 52 from either the VoIP client 24 and the audio DSP 26. Step 106 represents looking up the session status message 50 which corresponds to the one or more session status messages 52. Step 108 represents formatting the session status message 50 for display on the display 30. It should be appreciated that, for example, if caller ID data is received in-band, the DSP 26 may generate several session status signals 52, one corresponding to each digit of the caller ID data. However, only a single session status message 50 with the complete caller ID data may be formatted for display on the display 30.

Detailed Exemplary Gateway

As previously discussed, the VoIP gateway 36 may be a gateway commonly known as a GR303 gateway. However, it is envisioned that the teachings of the present invention are useful with other gateway systems which utilize in-band signaling and, more specifically, with other gateway systems which: i) operates as a VoIP endpoint for establishing UDP/IP media session channels between itself and the VoIP telephone 14 at the subscribers premises; and ii) operate as a media relay server for relaying session media data to support a VoIP telephone call to or from the VoIP telephone 14. In one exemplary embodiment, the VoIP gateway 36 may be a gateway structures similar to gateways commonly known as a GR303 gateway.

As discussed, when a VoIP telephone 14 is taken "off hook" to place an outbound call to a destination, a UDP/IP media channel 46 is immediately established between the VoIP telephone 14 and the VoIP gateway 36. Traditional call signaling (e.g. dial tone, DTMF tones, ring back, busy tones, and call waiting tones) is accomplished using traditional in-band analog or digital PSTN session signaling which, when modulated onto voice band, is compressed within RTP frames and transferred between the VoIP gateway 36 and the VoIP telephone 14 over the UDP/IP media channel 46 established there between. The VoIP gateway 36 interprets the in band signals and attempts to complete the call to the dialed destination endpoint over the PSTN or other VoIP channels.

To complete calls over the PSTN, the VoIP gateway 36 may include (or be associated with) a PSTN trunking gateway 38. The PSTN trunking gateway 38 comprises known circuits for placing and receiving PSTN call legs (e.g. call sessions over the PSTN 40) and interfacing between a PSTN call leg and a VoIP call leg (e.g the media session over the UDP/IP channel with the VoIP telephone 14). The PSTN trunking gateway 38 may include (or be associate with) a known signaling gateway 23 for interfacing with a PSTN signaling network (e.g. SS7 network) 15. Although the PSTN gateway 38 is shown separate form the VoIP gateway 36 for purposes of illustrating the invention, those skilled in the art will appreciate that the structure and functions of the PSTN gateway 38 may be combine with the structure and functions of the VoIP gateway 36.

To complete calls to remote VoIP endpoints (e.g. other gateways or peer-to-peer VoIP endpoints), the VoIP gateway may include XXX for: i) contacting a proxy server or call agent associated with the destination endpoint; ii) establishing UDP/IP media session channels between itself and the destination endpoint; iii) and relaying media session data 48 between the UDP/IP media session established with the VoIP telephone 14 at the subscribers premises and the UDP/IP media session channel established with the remote destination endpoint.

When a call is dialed from a remote endpoint to the telephone number associated with the "virtual telephone line" service provided by the VoIP gateway 36 to the IP telephone 14, the call is routed (either over the PSTN or over the Internet by proxy servers and call agents) to the VoIP gateway 36. The VoIP gateway 36 then attempts to complete the call and establish a UDP/IP media channel 46 with the VoIP telephone 14. Call signaling for such an inbound call is performed utilizing VoIP call signaling messages communicated between the VoIP gateway 36 and a VoIP client 24 of the VoIP telephone 14. After the call is established, call signaling associated with call waiting, call waiting caller ID, DTMF tones for navigating an audio prompts menu are exchanged between the VoIP gateway 36 and the VoIP telephone 14 in band.

It should be appreciated that the systems and methods discussed herein provide for a VoIP telephone which displays session status messages based on both session status signals provided by a VoIP client module and session status signals based on in-band signaling detected by the DSP 26. Although the invention has been shown and described with respect to certain preferred embodiments, it is obvious that equivalents and modifications will occur to others skilled in the art upon the reading and understanding of the specification. For example, the exemplary embodiments discussed herein operate utilizing a DSL modem and a GR303 gateway. However, it is readily apparent to those skilled in the art that the teachings of the present invention may also be implemented utilizing other internet service provider technologies. The present invention includes all such equivalents and modifications, and is limited only by the scope of the following claims.

What is claimed is:

1. A voice over Internet protocol (VoIP) telephone comprising:

a network communication system for encapsulating data into IP frames for exchange with remote devices over a frame switched network;

a system client application coupled to the network communication system for exchanging call set up messages with a remote VoIP gateway to establish a media channel for the exchange of media session data;

a dialog system coupled to the network communication system, the dialog system comprising an audio signal processor, wherein the audio signal processor comprises:

a compression module, wherein the compression module is adapted to:

translate frames of compressed digital audio data originated from a remote device to recreate remote voice band; and detect and translate local voice band to compressed digital audio data for transmission to the VoIP gateway; and a signal detection module, wherein the signal detection module comprises:

an interpreter circuit;

a frequency detection circuit, wherein the frequency detection circuit is adapted to provide an indication of frequency patterns detected within the remote voice band to the interpreter circuit;

a cadence detection circuit, wherein the cadence detection circuit is adapted to provide an indication of cadence patterns detected within the remote voice band to the interpreter circuit;

a phase shift detection circuit, wherein the phase shift detection circuit is adapted to provide an indication of phase shift patterns detected within the remote voice band; and wherein the interpreter circuit is adapted to:

utilize a first table to generate a session status signal matching a combination of the frequency patterns, the cadence patterns and the phase shift patterns; and provide the session status signal to a presentation module; and wherein the presentation module comprises a message look up table, the message look up table being adapted to store a plurality of session status messages, each in association with a session status signal; and wherein the presentation module is adapted to:
  receive the session status signal
  look up, in the message look up table, the session status message that corresponds to the received session status signal; and
  drive a display of the session status message on a display screen.

2. The VoIP telephone of claim 1, wherein:

the frequency detection circuit is further adapted to provide an indication of frequency patterns detected within the local voice band to the interpreter circuit;

the cadence detection circuit is further adapted to provide an indication of cadence patterns detected within the local voice band to the interpreter circuit;

the phase shirt detection circuit is further adapted to provide an indication of phase shift patterns detected within the remote voice band; and wherein the interpreter circuit is further adapted to utilize the first table to generate a session status signal matching a combination of the frequency patterns, the cadence patterns and the phase shift patterns of the local voice band; and wherein the presentation module drives the display of session status messages in accordance with the session status signals from both the remote voice band and the local voice band.

3. The VoIP telephone of claim 1, further comprising:

a key pad system for modulating the local voice band with a tone corresponding to an operator depressed key to generate an in-band signaling within the local voice band; and the in band signal detection module further detects in-band signaling within the local voice band and generates a session status signal corresponding thereto.

4. The telephone of claim 2, wherein the interpreter circuit is adapted to provide a busy status signal to the presentation module upon receiving:
  an indication that the frequency detection module has detected a frequency corresponding to a busy signal; and
  an indication that the cadence detection module has detected a cadence pattern corresponding to busy signal.

5. The telephone of claim 2, wherein the interpreter circuit is adapted to provide a ring back status signal to the presentation module upon receiving:
  an indication that the frequency detection module has detected a frequency corresponding to a ring back signal; and
  an indication that the cadence detection module has detected a cadence pattern corresponding to ring back signal.

6. The telephone of claim 2, wherein the interpreter circuit is adapted to provide a particular caller ID digit status signal to the presentation module upon:
  receiving an indication that the phase shift detection circuit has detected a phase shift pattern corresponding to the particular caller ID digit;
  determining that the phase shift pattern corresponding to the particular caller ID digit is after receiving an indication that the phase shift detection circuit has detected a phase shift pattern corresponding to the start of caller ID data; and
  determining that the phase shift pattern corresponding to the start of caller ID data is between rings of a ring back tone.

7. The telephone of claim 3, wherein the interpreter circuit is adapted to provide a particular digit status signal to the presentation module upon receiving:
  an indication that the frequency detection module has detected a frequency corresponding to a DTMF tone of the particular digit; and
  an indication that the cadence detection module has detected a cadence pattern corresponding to a time duration typical of operator activation of the operator depressed key.

* * * * *